United States Patent [19]

Shook et al.

[11] Patent Number: 5,703,506

[45] Date of Patent: Dec. 30, 1997

[54] SIGNAL PROCESSING METHOD

[75] Inventors: Stephen G. Shook; Christopher K. Y. Chun, both of Gilbert; Daniel B. Schwartz, Apache Junction, all of Ariz.

[73] Assignee: Motorola, Schaumburg, Ill.

[21] Appl. No.: 578,726

[22] Filed: Dec. 26, 1995

[51] Int. Cl.$^6$ ............................. H04Q 9/00; G08G 1/01
[52] U.S. Cl. ........................ 327/87; 327/90; 327/91; 327/70; 327/551; 327/50; 327/77; 327/514
[58] Field of Search .......................... 327/90, 91, 94, 327/95, 77, 100, 142, 306, 331, 332, 70, 87, 514, 551, 552, 311, 63, 68, 69

[56] References Cited

U.S. PATENT DOCUMENTS

| | | | |
|---|---|---|---|
| 3,875,381 | 4/1975 | Wingfield et al. | 235/151.3 |
| 4,276,539 | 6/1981 | Eshraghian et al. | 327/91 |
| 5,434,564 | 7/1995 | Nakanuma | 327/100 |

FOREIGN PATENT DOCUMENTS

| | | | |
|---|---|---|---|
| 8500898 | 10/1985 | Netherlands | 327/91 |

OTHER PUBLICATIONS

Makoto Nakamura et al., "An Instantaneous Response CMOS Optical Receiver IC with Wide Dynamic Range and Extremely High Sensitivity Using Feed-Forward Auto-Bias Adjustment", IEEE Journal of Solid-State Circuits, vol. 30, No. 9, Sep. 1995, pp. 991-997.

*Primary Examiner*—Timothy P. Callahan
*Assistant Examiner*—Dinh T. Le
*Attorney, Agent, or Firm*—Eugene A. Parsons

[57] ABSTRACT

A signal processing circuit (10) performs a sample and hold (16) of an input signal (14) and stores a maximum value of the input signal (18). A guardband signal (21) is developed that is less than the maximum value that is stored. The input signal is compared to the guardband signal to determine if the input signal is above or below the guardband signal. A threshold signal (25) is developed by taking a percentage of the maximum value that is stored. The input signal is compared to the threshold signal to regenerate the input waveform. If the input signal is below the guardband signal and above the threshold signal, the sample and hold circuit is reset to acquire a new maximum value of the input signal so that a new threshold can be used for regenerating the input signal.

12 Claims, 2 Drawing Sheets

SIGNAL PROCESSING METHOD

BACKGROUND OF THE INVENTION

The present invention relates, in general, to communication systems, and more particularly, to signal processing circuits for communication systems.

In the past, a variety of design approaches have been utilized to implement signal processing circuits for communication systems, such as receivers for optical communication systems. Several methods are used for receiver designs in such systems including differential, adaptive feedback, fixed threshold, and edge detection methods.

One problem with the adaptive feedback receivers is the operation during idle time of the burst-mode communication signal applied to the receiver. Such circuits typically utilize differential amplifiers and have feedback loops in order to implement automatic gain control and automatic offset control within the receivers. During idle time, the feedback loop decreases threshold voltage applied to the differential amplifiers thereby causing the receiver to output noise. Additionally, the peak and minimum input voltage values drift over time causing pulse width distortion or even erroneous signals in the output from the receivers.

Fixed threshold schemes typically require a large dynamic range which results in pulse width distortion. Differential and edge detection schemes are edge rate dependent and also result in pulse width distortion.

Accordingly, it is desirable to have a signal processing circuit that does not oscillate, that does not utilize feedback, and that minimizes pulse width distortion in the output signal.

DETAILED DESCRIPTION OF THE DRAWINGS

Figure 1:
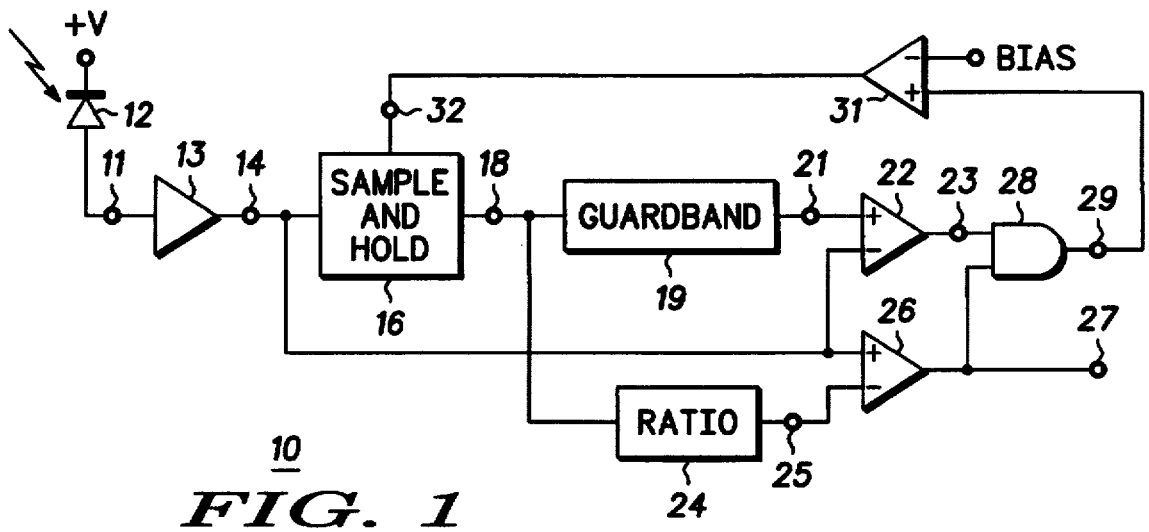
FIG. 1 schematically illustrates a signal processing circuit in accordance with the present invention.

FIG. 1 schematically illustrates a signal processing circuit 10 that is suitable for receiving burst-mode signals, and that minimizes pulse-width distortion. Circuit 10 includes a received data input 11 suitable for accepting a received signal, such as the signal from a photodetector 12 that detects light received by a fiber optic communication system. The received signal on input 11 is applied to an input of preamplifier 13 which amplifies the received signal and forms an input signal on an output of preamplifier 13. The input signal is applied to a signal input 14 of circuit 10.

A sample and hold circuit 16 receives the input signal from input 14 and stores a maximum stored value of the input signal on a storage element that is part of circuit 16. This function is typically referred to as sampling the input signal and holding the maximum stored value of the input signal on the storage element. A reset signal is applied to a reset input 32 of circuit 16 in order to change the maximum value of the input signal that is stored on the storage element as will be seen hereinafter. The maximum stored value of the input signal is applied to an output 18 of circuit 16.

A guardband circuit 19 receives the maximum stored value from output 18 and generates a guardband signal on an output 21 of circuit 19. The guardband signal is less than the maximum value of the input signal and is used to determine when the input signal amplitude has decreased to a value that requires resetting circuit 16 in order to change the maximum stored value of the input signal. The differential between the maximum stored value of the input signal and the guardband signal typically is chosen to be a multiple of the signal noise value on the input signal applied to input 14. That is, the guardband signal is less than the maximum stored value of the input signal by an amount that is a multiple of the noise anticipated on the input signal. This differential value differs based on the system environment in which signal processing circuit 10 is used. Guardband circuit 19 can have a variety of circuit implementations including a simple resistive voltage divider.

The guardband signal is applied to a positive input of a comparator 22 while the input signal from input 14 is applied to a negative input of comparator 22. Thus, comparator 22 compares the input signal to the guardband signal. Comparator 22 produces a below guardband signal on an output 23. The below guardband signal is an inverted reproduction of the input signal as long as the maximum value of the input signal remains greater than the guardband signal. When the maximum value of the input signal is less than the guardband signal, output 23 remains at a high voltage level. Setting the guardband signal less than the maximum value of the input signal by a multiple of the input noise assist in ensuring that noise on the input signal does not result in false indications that the input signal is below the guardband signal.

A ratio circuit 24 receives the maximum stored value of the input signal and generates a threshold value or threshold signal on an output 25. The threshold signal is a percentage value of the maximum stored value of the input signal, that is, circuit 24 functions as a divider that reduces the value of the maximum stored value of the input signal by a percentage value. Circuit 24 can have a variety of circuit implementations including, but not limited to, a resistive voltage divider network. The threshold value or threshold signal is used to bias a comparator 26 and is compared to the input signal in order to reproduce the waveshape of the input signal. Consequently, output 25 is connected to a negative input of comparator 26 while the input signal is applied to a positive input of comparator 26. The waveshape of the input signal is reproduced on an output 27 of comparator 26. Typically, the percentage value is approximately fifty percent, that is, the threshold signal is approximately one-half of the maximum stored value of the input signal that is presented on output 18. This assists in ensuring that the output signal on output 27 is symmetrical and minimizing pulse width distortion.

A logical AND circuit 28 is used to generate a recapture signal on an output 29 of circuit 28. Circuit 28 logically ANDs the output signal on output 27 with the below guardband signal on output 23. When the output signal and the below guardband signal are both logically positive the recapture signal becomes active and subsequently causes circuit 16 to be reset. That is, when the input signal on input 14 is both greater than the threshold signal and less than the guardband signal, the recapture signal becomes active. Although circuit 28 performs a digital function, it typically is an analog circuit, as will be seen hereinafter in FIG. 2, in order to match the voltages on outputs 23 and 27. A shaping circuit 31 receives the recapture signal and generates a reset signal on an output that is connected to reset input 32 of circuit 16. Typically, circuit 31 is a comparator with the recapture signal connected to a positive input and a bias signal connected to a negative input. The bias signal is generated by circuitry, not shown, that is sufficient to remove noise on the recapture signal applied to circuit 31. The reset signal developed by circuit 31 has a voltage value that is suitable for causing circuit 16 to sample the input signal and store a new maximum stored value on the storage element of circuit 16.

Figure 2:
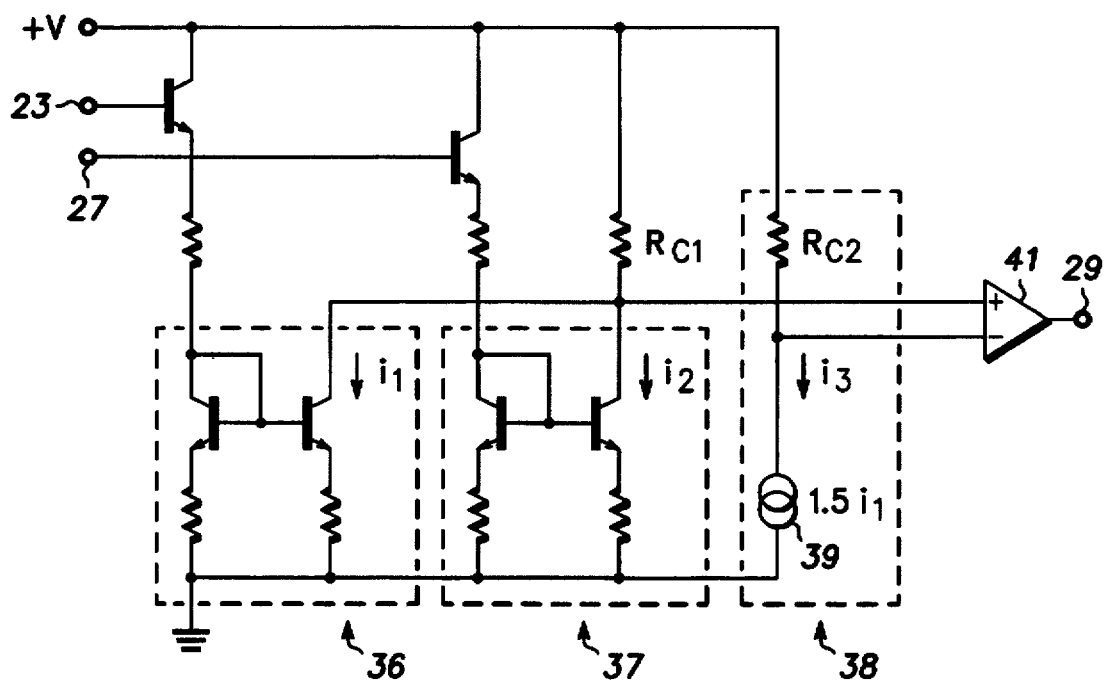
FIG. 2 schematically illustrates a portion of the signal processing circuit of FIG. 1 in accordance with the present invention.

FIG. 2 schematically illustrates an embodiment of circuit 28 shown in FIG. 1. Elements of FIG. 2 that have the same reference numbers as FIG. 1 are the same as the corresponding FIG. 1 elements. FIG. 2 illustrates an example of one embodiment that can be used for circuit 28 even though many other implementations are possible. Circuit 28 includes a first current mirror 36 and a second current mirror 37 that are used to establish substantially identical currents $i_1$ and $i_2$ that flow when inputs 23 and 27, respectively, are active. A reference leg 38 has a current source 39 that establishes a current flow $i_3$ through a resistor $R_{c2}$ that is approximately 1.5 times current $i_1$ or current $i_2$. The voltage resulting from current $i_3$ s applied to a negative input of a comparator 41. The voltage resulting from currents $i_1$ and $i_2$ is applied to a positive input of comparator 41. When either input 23 or 27 is a low voltage, either current $i_1$ or current $i_2$ flows through a resistor $R_{c1}$. This causes the voltage at the positive input of comparator 41 to be greater than the voltage at the negative terminal, thus output 29 is at a high voltage. When both inputs 23 and 27 are at a high voltage, currents $i_1$ and $i_2$ both flow through resistor $R_{c1}$ and the voltage at the positive input of comparative 41 is less than the voltage at the negative input so that output 29 is at a low voltage.

Figure 3:
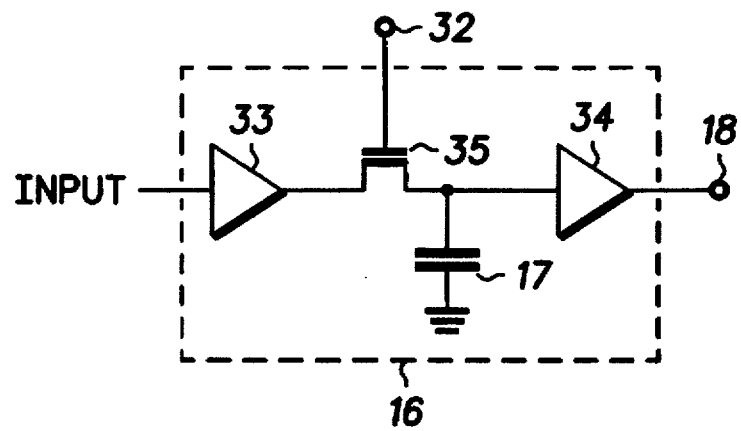
FIG. 3 schematically illustrates another portion of the signal processing circuit of FIG. 1 in accordance with the present invention.

FIG. 3 schematically illustrates an embodiment of a sample and hold circuit that is suitable for use as circuit 16 shown in FIG. 1. Elements of FIG. 3 that have the same reference numbers as FIG. 1 are the same as the corresponding FIG. 1 elements. FIG. 3 illustrates an example of one embodiment that can be used for circuit 16 even though many other implementations are possible. Circuit 16 includes an input buffer 33 that isolates circuit 16 from input 14. A switch 35 is used to couple the output of buffer 33 to a storage element 17 when the reset signal is applied to circuit 16. An output buffer 34 isolates storage element 17 from circuitry connected to output 18. Typically, storage element 17 is a capacitor as illustrated in FIG. 2.

Figure 4:
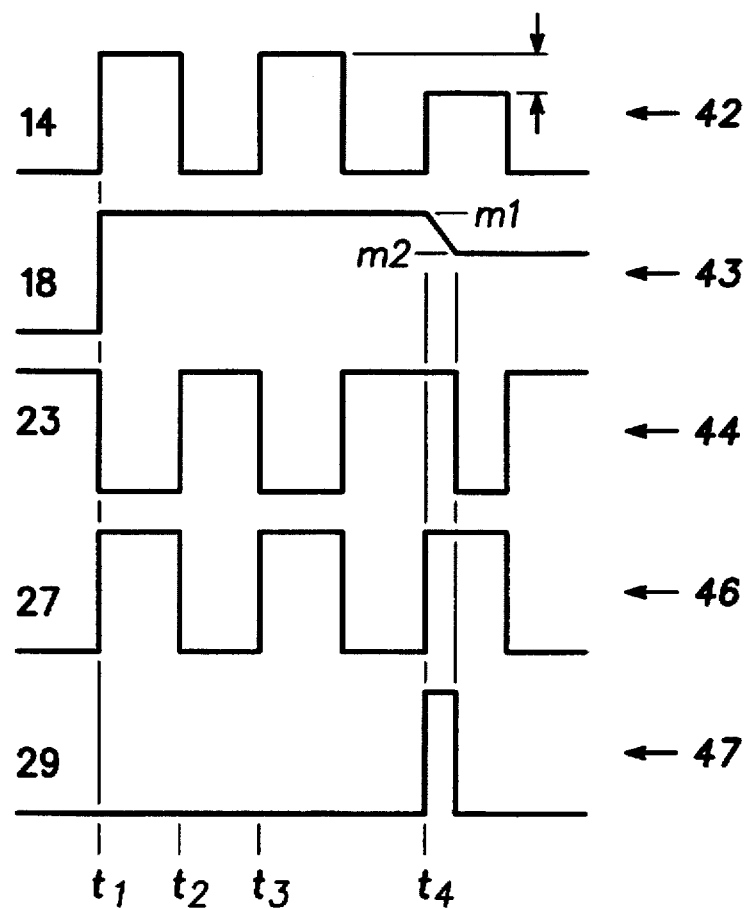
FIG. 4 is a timing diagram illustrating the operation of a portion of the signal processing circuit illustrated in FIG. 1 in accordance with the present invention.

FIG. 4 is a timing diagram illustrating timing for the reset function of circuit 10. Elements of FIG. 4 that have the same reference numbers as FIG. 1, refer to the corresponding FIG. 1 elements. The input signal on input 14 of circuit 10 is illustrated by a waveform 42. A waveform 43 represents the maximum stored input value on output 18, a waveform 44 illustrates the below guardband signal on output 23, a waveform 46 illustrates the output signal on output 27, and a waveform 47 illustrates the recapture signal on output 29. At time $t_1$ the input signal becomes a positive voltage and a first maximum stored value m1 is applied to output 18. Because the input signal (waveform 42) is greater than the guardband signal the below guardband signal (waveform 44) becomes negative. Additionally, because the input signal is at a high voltage and is above the threshold signal on output 25, the output signal (waveform 46) of circuit 10 goes high. Since the below guardband signal (waveform 44) is low, the recapture signal (waveform 47) from AND circuit 28 is at a low voltage.

At time $t_2$, the input signal (waveform 42) goes low. Because this value of the input signal is less than the guardband signal, the below guardband signal (waveform 44) goes high. Because the input signal is below the threshold signal, the output signal (waveform 46) goes low and presents a low voltage to AND circuit 28, thus, the recapture signal (waveform 47) remains a low voltage. At time $t_3$ when the input signal to AND circuit 28 on input 14 once again goes high, waveforms 44 and 46 once again present a low voltage to circuit 28 so that the recapture signal (waveform 47) remains low. This is similar to the sequence at time $t_1$.

At time $t_4$, the input signal (waveform 42) once again goes high but the maximum value of the input signal is now less than the maximum value during time $t_1$ and time $t_3$. Because the value of the input signal at time $t_4$ is less than the guardband signal, the below guardband signal (waveform 44) remains high after time $t_4$. Because the input signal is above the threshold signal the output signal on output 27 (waveform 46) goes high as indicated. Consequently, there is an overlap between the output signal and the below guardband signal at time $t_4$ so that both inputs 23 and 27 of circuit 28 (waveforms 44 and 46, respectively) are high. This causes the recapture signal on output 29 (waveform 47) to go high at time $t_4$. As a result, sample and hold circuit 16 changes the maximum stored value on the storage element to a second maximum value m2 (waveform 43) which is the new value of the input signal. Because the maximum stored value has changed to the new lower maximum value of the input signal, the input signal is now greater than the guardband signal and the below guardband signal goes low (waveform 44) causing the recapture signal (waveform 47) to go low and end the reset process. Therefore, a new maximum stored value has been acquired which changes the threshold signal applied to comparator 26 thereby ensuring that the threshold voltage applied to comparator 26 is the proper percentage of the maximum value of the input signal so that the output signal on output 27 substantially reproduces the input signal without pulse width distortion. It should be noted however that a small amount of pulse width distortion will exist in the first pulse out of circuit 10 after time t4. This is due to the rising edge of the input signal being compared to an improper threshold prior to the time circuit 16 is reset to change the maximum stored value.

By now it should be appreciated that there has been provided a novel method of processing signals. Comparing the input signal to a guardbanded value of the maximum input signal facilitates determining when the maximum value of the input signal has changed and a new threshold voltage should be utilized in order to reconstruct the input signal. Changing the maximum stored value of the input signal while the input signal is high facilitates storing the new maximum value of the input signal and also facilitates establishing a new threshold voltage substantially without introducing pulse width distortion. Because feedback circuits are not utilized for setting amplifier gains, the circuit does not oscillate.

We claim:

1. A signal processing method comprising:
   holding a maximum value of an input signal on a storage element as a maximum stored value;
   generating a guardband signal based on an output signal of the storage element that is less than the maximum stored value of input signal by an amount that is a multiple of a noise anticipated on the input signal;
   changing the maximum stored value on the storage element when the input signal is less than the guardband signal; and
   generating a threshold signal that is a percentage value of the maximum stored value, and comparing the input signal to the threshold signal for generating an output signal.

2. The method of claim 1 wherein holding the maximum stored value includes sampling the input signal and storing a maximum value of input signal value on the storage element.

3. The method of claim 2 wherein sampling the input signal and storing the maximum value of the input signal on the storage element includes using a sample and hold circuit for sampling the input signal and holding the maximum value of the input signal.

4. The method of claim 3 wherein changing the maximum stored value includes resetting the sample and hold circuit.

5. The method of claim 1 wherein changing the maximum stored value includes changing the maximum stored value when the input signal is greater than the threshold signal.

6. A signal processing method comprising:

sampling an input signal and storing a first maximum value of the input signal on a storage element as a first maximum stored value;

generating a guardband signal based on an output signal of the storage element that is less than the first maximum stored value of input signal by an amount that is a multiple of a noise anticipated on the input signal;

comparing the guardband signal to the input signal;

sampling the input signal and storing a second maximum value of the input signal as a second maximum stored value that is different from the first maximum stored value wherein the second maximum stored value is stored on the storage element when the input signal is less than the guardband signal; and generating a threshold signal that is a percentage value of the first maximum stored value of the input signal, and comparing the input signal to the threshold signal for generating an output signal.

7. The method of claim 6 wherein sampling the input signal and storing the second maximum stored value of the input signal includes storing the second maximum stored value when the input signal is greater than the threshold signal.

8. The method of claim 6 wherein generating the threshold signal that is the percentage value of the first maximum stored value includes dividing the first maximum stored value to form the threshold signal.

9. A signal processing method comprising:

sampling an input signal and holding a maximum value of the input signal on a storage element as a maximum stored value by an amount that is a multiple of a noise anticipated on the input signal;

generating a guardband signal based on an output signal of the storage element that is less than the maximum stored value;

comparing the guardband signal to the input signal for generating a below guardband signal;

generating a threshold signal that is a percentage value of the maximum stored value;

comparing the input signal to the threshold signal for generating an output signal; and changing the maximum stored value on the storage element when the output signal and the below guardband signals are both logically positive.

10. The method of claim 9 wherein comparing the guardband signal to the input signal includes applying the input signal to a negative input of a comparator, and applying the guardband signal to a positive input of the comparator.

11. The method of claim 9 herein comparing the input signal to the threshold signal includes applying the input signal to a positive input of a comparator, and applying the threshold signal to a negative input of the comparator.

12. The method of claim 9 wherein changing the maximum stored value on the storage element when the output signal and the below guardband signals are both logically positive includes logically ANDing the output signal with the below guardband signal.

* * * * *